United States Patent Office 3,556,828
Patented Jan. 19, 1971

3,556,828
PROCESS FOR TREATING TITANIUM
DIOXIDE PIGMENTS
George G. Durrant, Healing, and Ernest Brunskill, Cleethorpes, England, assignors to Laporte Titanium Limited, London, England, a British company
No Drawing. Filed Jan. 22, 1968, Ser. No. 699,325
Int. Cl. C09c 1/36, 3/00; C08g 51/04
U.S. Cl. 106—300
10 Claims

ABSTRACT OF THE DISCLOSURE

A process for treating titanium dioxide pigments containing alumina to increase the durability characteristics of the pigment which includes the steps of forming an aqueous slurry or paste of the pigment, maintaining the pigment in slurry form for a period of time and thereafter adding to the slurry at least one phosphorus-containing dispersing agent to form a dispersion of the titanium dioxide pigment. Conventional procedures may then be used to recover the pigment from said dispersion.

BACKGROUND OF THE INVENTION

(1) Field of the invention

This invention relates to the treatment of titanium dioxide pigments. More particularly, it relates to a process for the treatment of titanium dioxide pigment that contains acid-soluble alumina to improve the durability characteristics of the pigment.

(2) Description of prior art

It has previously been proposed to subject titanium dioxide pigments, which may contain alumina, to a surface treatment with a hydrous oxide, for example, alumina, in order to improve the durability characteristics of the pigments. Prior to the surface treatment the pigment is dispersed in water using a phosphorus compound that acts as a dispersing agent and then classified.

SUMMARY OF THE INVENTION

It has now been found that, if the raw pigment containing alumina is allowed to remain in contact with water for a substantial period of time prior to its dispersion using the phosphorus compound that acts as a dispersing agent, a further improvement in the durability characteristics of the pigment can be achieved.

The present invention provides a process for the treatment of a titanium dioxide pigment that contains alumina of which at least a part is acid-soluble (as hereinafter defined). The process comprises incorporating water with the pigment to form a slurry or paste of pigment containing at least 30% water, by weight, and having a pH not exceeding 5.0. Thereafter, at least one phosphorus-containing dispersing agent is added to the slurry to form a dispersion thereof. The addition of the dispersing agent to the pigment slurry is deferred for a sufficiently long period of time after the formation of the slurry or paste to effect an improvement in the durability characteristics of the pigment.

In ascertaining whether the durability characteristics of the pigment have been improved, pigment prepared in accordance with this invention is compared with pigment that has been prepared and treated in an exactly similar manner except that the phosphorus compound that acts as a dispersing agent and, if (as is described hereinafter) an alkali is used, are incorporated with the pigment substantially immediately after the incorporation of water to form the pigment slurry.

DESCRIPTION OF THE PREFERRED EMBODIMENTS

The present invention is based upon the discovery that the durability characteristics of titanium dioxide pigment containing alumina may be improved by maintaining the pigment in contact with water for a substantial period of time prior to adding a phosphorus-containing dispersing agent to the pigment to form an aqueous dispersion of titanium dioxide.

According to this invention, water is added to titanium dioxide pigment to form an aqueous slurry or paste of the pigment, the slurry containing at least 30% water, by weight. Although the process is operable with slurries or pastes of pigments containing larger quantities of water, an increase in the proportion of water, by increasing the bulk of the slurry or paste, makes handling more difficult. Advantageously, the water that is incorporated with the pigment to form the slurry or paste is demineralized water.

The titanium dioxide pigment used may have been formed by the vapor-phase oxidation of titanium tetrachloride or by the hydrolysis of an aqueous solution of titanium sulphate, in which latter case the titanium dioxide will have been calcined to develop its pigmentary properties.

The pigment to be treated contains at least 0.25% by weight of acid-soluble alumina based on the weight of the pigment. The term "acid-soluble alumina" is used throughout the specification and claims to mean alumina that dissolves if the pigment is boiled with excess 6 N hydrochloric acid. In the case of titanium dioxide formed by the vapor-phase oxidation of titanium tetrachloride, the alumina will have been incorporated with the titanium dioxide by forming the alumina (for example, by the oxidation of aluminum chloride or aluminum metal) in the oxidation zone. In the case of titanium dioxide formed by the hydrolysis of an aqueous solution of titanium sulphate, the alumina will have been incorporated with the titanium dioxide by incorporating an aluminum compound with the titanium dioxide prior to calcination. In each case, the total quantity of alumina contained in the pigment will not usually exceed 5% by weight, based on the weight of the pigment.

The aqueous slurry is maintained for at least 24 hours and preferably for at least 48 hours. A longer period of time within the range of from about 144 to 240 hours has also proved to give good results. If the temperature of the water is increased, it may be found that shorter periods of time will suffice to give a useful degree of improvement in the durability of the pigment.

The pH of the pigment slurry or paste is maintained at 5.0 or below during this period. If the pH of the slurry or paste would otherwise exceed 5.0, a substance or mixture of substances that serves to reduce the pH, for example, hydrochloric acid, titanium tetrachloride or aluminum chloride, or a mixture of titanium tetrachloride and aluminum chloride, may be added in the formation of the slurry or paste.

The phosphorus compound that acts as a dispersing agent may be sodium hexametaphosphate, sodium pyrophosphate, mono-, di- or tri-sodium phosphate and organic phosphates including, for example, phosphate esters or salts of acylation products of phosphorus acid. If desired, a mixture of one or more of such phosphorus compounds may be used as the dispersing agent.

The quantity of the phosphorus-containing dispersing agent (calculated as $P_2O_5$) that is incorporated with the pigment may vary within the range of from about 0.05% to 1.5% and preferably, from about 0.1% to 0.5%, by weight, based on the weight of the pigment.

If desired, an alkali also can be incorporated with the pigment in order to form the dispersion of the pigment. The alkali, preferably sodium hydroxide, should be used in quantities sufficient to maintain the pH of the slurry within the range of from 9 to 12, preferably, from 9 to 11.

The phosphorus-containing dispersing agent and the alkali may be added in succession (in either order) or at the same time.

The dispersion containing the dispersing agent or agents may be classified to removed overize particles, flocculated in a conventional manner, filtered, washed to remove salts, dried and milled. Advantageously, however, the pigment is subjected, following the classification step, to surface treatment for example by coating the pigment with one or more hydrous oxides, preferably, one or more of silica, titania, zirconia, cerium oxide and alumina or by contacting the pigment with organic treating agents or metal phosphates.

The titanium dioxide pigment that has been treated according to the process of this invention may be incorporated in paint, plastics or other materials.

The following examples illustrate the invention, all the percentages being by weight.

EXAMPLE 1

A quantity of a titanium dioxide pigment A that had been formed by the vapor-phase oxidation of titanium tetrachloride was added to demineralized water. Pigment A contained, in addition to titanium dioxide, a total of 1.5% alumina, 0.7% acid-soluble alumina, 0.2% acid-soluble $TiO_2$ ($TiO_2$ that dissolves if the pigment is boiled with excess 6 N hydrochloric acid) and a total of 0.2% chloride, all percentages being based on the weight of the pigment.

The concentration of the pigment in the resulting slurry was approximately 1,000 grams per liter (so that the slurry contained 43% water, by weight) and the pH of the slurry was within the range of from 3.2 to 3.5.

Approximately 72 hours after the formation of the slurry, which was maintained throughout that period at a temperature of substantially 20° C. sodium pyrophosphate and an aqueous solution of sodium hydroxide were added to the slurry. The quantity of sodium pyrophosphate was equal to 0.25%, based on the weight of the pigment, and the quantity of sodium hydroxide was such as to raise the pH to 10.

The alkaline slurry containing the phosphate was subjected to wet milling, diluted with demineralized water to reduce the concentration of pigment to 400 grams per liter and the pigment in the diluted slurry was classified to remove particles having diameters exceeding 5 microns.

The resulting suspension of fines was heated to raise its temperature to 80° C., treated with a solution of titanium tetrachloride and then with a solution of sodium aluminate. The solution of titanium tetrachloride contained 165 grams titanium tetrachloride (calculated as titanium dioxide) per liter and the quantity of the solution used was sufficient to introduce 1.0% of titanium tetrachloride (calculated as titanium dioxide) based on the weight of the raw pigment. The sodium aluminate solution contained 100 grams sodium aluminate (calculated as $Al_2O_3$) per liter and the quantity of the solution used was sufficient to introduce 10% sodium aluminate (calculated as $Al_2O_3$) based on the weight of the raw pigment.

The resulting pigment slurry was neutralized to a pH of 7.0, washed with water, dried and milled in a fluid-energy mill.

The pigment was then tested for durability by making it up into a paint in alkyd resin at 16% P.V.C. and exposing the paint to natural weathering in the United Kingdom. The resin was a long-oil linseed oil alkyd resin solution in white spirit having a solids content of 70% by weight. The paint was examined at intervals for gloss (45°) and also for chalking on a scale in which 0 represents no chalking and 10 represents bad chalking. The results of these examinations are set forth in Table 1.

To provide a basis for comparison with Example 1, a further quantity of pigment A was treated in the same manner as in Example 1 with the single exception that the sodium pyrophosphate and the aqueous solution of sodium hydroxide were added to the slurry substantially immediately after its formation. The treated pigment was tested for durability in the same manner as in Example 1 and the results of the examinations are set forth in Table 1.

EXAMPLE 2

A quantity of titanium dioxide pigment B that had been formed by the vapor-phase oxidation of titanium tetrachloride was treated as in Example 1 to give a slurry as specified in that example. Pigment B contained a total of 1.7% alumina, 0.6% acid-soluble alumina, 0.12% acid soluble titanium dioxide and a total of 0.16% chloride, all percentages being based on the weight of the raw pigment.

The treated pigment B was tested for durability as in Example 1 and the results of the examinations are set forth in Table 1.

As with Example 1, a comparison experiment was carried out using pigment B and repeating all the conditions of Example 2 except for the delay in adding the phosphate and alkali to the slurry. The results of this experiment are set forth in Table 1.

TABLE 1

| Pigment | Experiment | Exposure (in months) and chalk rating | | | | Exposure (in months) and gloss 45° | | | | | | | |
|---|---|---|---|---|---|---|---|---|---|---|---|---|---|
| | | 10 | 12 | 14 | 16 | 0 | 3 | 6 | 8 | 10 | 12 | 14 | 16 |
| A | Example 1 | 0 | 3 | 4 | 4 | 97 | 95 | 91 | 84 | 72 | 62 | 60 | 51 |
| A | Comparison | 0 | 4 | 5 | 5 | 96 | 89 | 76 | 75 | 65 | 55 | 52 | 40 |
| B | Example 2 | 0 | 3 | 4 | 4 | 97 | 96 | 92 | 87 | 63 | 48 | 52 | 47 |
| B | Comparison | 0 | 4 | 5 | 5 | 93 | 85 | 75 | 72 | 55 | 48 | 47 | 40 |

EXAMPLE 3

A quantity of titanium dioxide pigment C that had been formed by the vapor-phase oxidation of titanium tetrachloride was treated as in Example 1 to give a slurry as specified in that example, except that the period of time that elapsed between the formation of the slurry and the introduction of the phosphate and alkali was approximately 216 hours and that the durability of the pigment was tested by making it into a paint as in Example 1 and then using an accelerated weathering machine (employing an arc from a xenon lamp and employing an intermittent water spray onto the test paint panels) instead of exposing the paint to natural weathering. The results of this test are set forth in Table 2.

TABLE 2

| Pigment | Experiment | Time of exposure in hours and weight loss in grams per square centimeter | | | | | | | | |
|---|---|---|---|---|---|---|---|---|---|---|
| | | 241 | 474 | 683 | 813 | 1,053 | 1,285 | 1,660 | 1,894 | 2,133 |
| C | Example 3 | 0.9 | 1.5 | 2.2 | 2.4 | 3.4 | 3.7 | 4.2 | 4.5 | 5.1 |
| C | Comparison | 1.2 | 1.9 | 2.6 | 3.0 | 3.6 | 4.0 | 4.6 | 5.1 | 5.6 |

Pigment C contained a total of 1.0% alumina, 0.6% acid-soluble alumina, 0.06% acid-soluble $TiO_2$ and a total of 0.14% chloride, all percentages being based on the weight of the raw pigment.

In order to provide a basis for comparison with Example 3, a further quantity of pigment C was treated in the same manner as in Example 3 except that the phosphate and alkali were added to the slurry substantially immediately after its formation. The durability of the treated pigment was tested as in Example 3 and the results of the test are set forth in Table 2.

It will be understood that various changes in the details, materials and steps which have herein been described and illustrated in order to explain the nature of the invention, may be made by those skilled in the art within the principle and scope of the invention as defined in the claims.

What is claimed is:

1. A process for treating titanium dioxide pigment that contains no more than about 5%, by weight, alumina of which at least 0.25% by weight is acid-soluble alumina based on the weight of the pigment which comprises incorporating water with the pigment to form a slurry containing at least 30% water, by weight, and having a pH of less than about 5.0, and thereafter incorporating from about 0.05% to 1.5% by weight based on the weight of said pigment of at least one phosphorus-containing compound that acts as a dispersing agent with the pigment to form a dispersion thereof, the incorporation of the dispersing agent with the pigment being delayed for a period of time of at least 24 hours after formation of the slurry to effect an improvement in the durability characteristics of the pigment.

2. The process as defined in claim 1 in which said phosphorus-containing dispering agent is selected from the group consisting of sodium phosphate, sodium pyrophosphate, sodium hexametaphosphate, organic phosphates, and mixtures thereof.

3. The process as defined in claim 1 in which said slurry is formed by adding demineralized water to said titanium dioxide pigment.

4. The process as defined in claim 1 in which the pH of said slurry is maintained below about 5.0 by adding an acidic material to said slurry.

5. The process as defined in claim 4 in which said acidic material is selected from the group consisting of hydrochloric acid, titanium tetrachloride, aluminum chloride and a mixture of titanium tetrachloride and aluminum chloride.

6. The process as defined in claim 1 in which an alkali is added to said slurry with said phosphorus-containing dispersing agent, said alkali being added in an amount sufficient to provide a pigment dispersion having a pH in the range of from about 9 to 12.

7. The process as defined in claim 6 in which said alkali is sodium hydroxide.

8. The process as defined in claim 1 in which said titanium dioxide pigment is recovered from said pigment dispersion.

9. The process as defined in claim 8 in which said titanium dioxide pigment is subjected to surface treatment with at least one hydrous oxide selected from the group consisting of silica, titania, zirconia, cerium oxide, alumina and mixtures thereof.

10. Titanium dioxide pigment having improved durability characteristics produced according to the process of claim 1.

References Cited

UNITED STATES PATENTS

| | | | |
|---|---|---|---|
| 1,937,037 | 11/1933 | Hanahan | 106—300X |
| 2,540,182 | 2/1951 | Albert | 106—308X |
| 2,668,776 | 2/1954 | Miller | 106—300 |
| 2,933,408 | 4/1960 | Dempster et al. | 106—308X |
| 3,127,280 | 3/1964 | Whately | 106—300 |
| 3,141,788 | 7/1964 | Whately | 106—300 |
| 3,169,074 | 2/1965 | Holbein | 106—300 |
| 3,178,303 | 4/1965 | Aagaard | 106—300 |
| 3,203,818 | 8/1965 | Richmann et al. | 106—300 |
| 3,251,705 | 5/1966 | Rieck et al. | 106—300 |
| 3,337,300 | 8/1967 | Hughes | 106—300X |

TOBIAS E. LEVOW, Primary Examiner

H. M. S. SNEED, Assistant Examiner

U.S. Cl. X.R.

106—308; 260—37, 40